W. M. BRADSHAW & W. G. MYLIUS.
ELECTRICAL MEASURING INSTRUMENT.
APPLICATION FILED MAY 28, 1913.
1,202,788.   Patented Oct. 31, 1916.
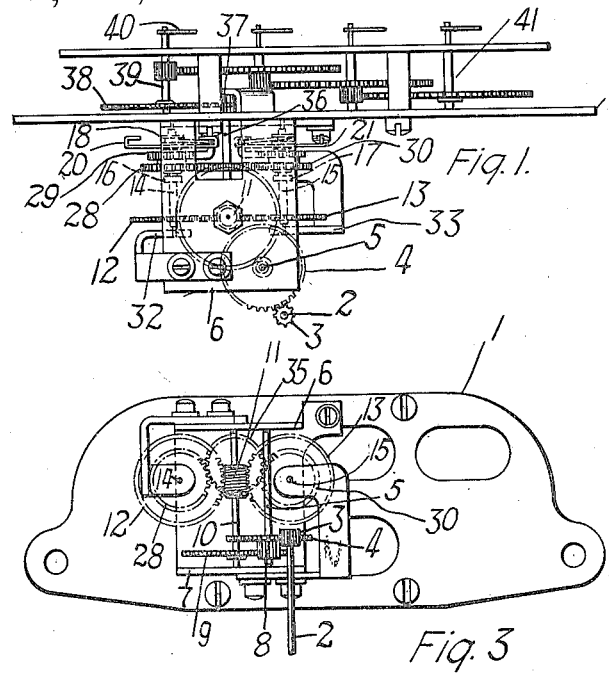
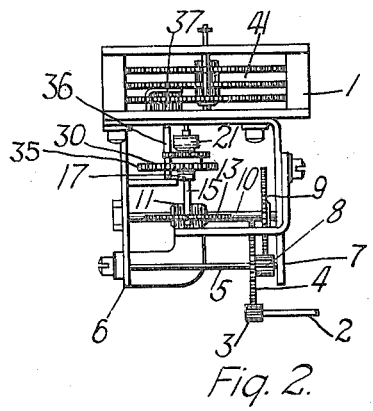
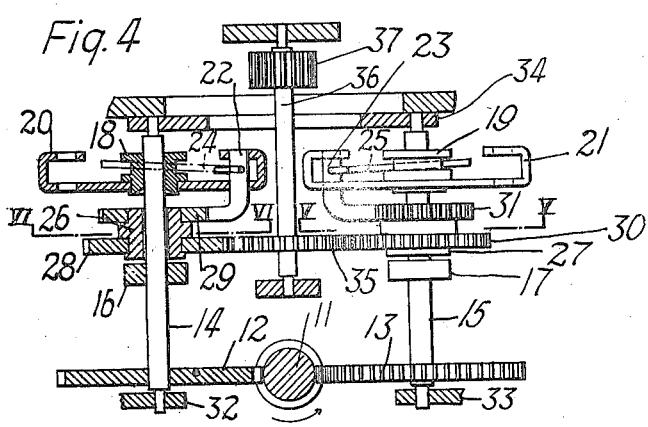
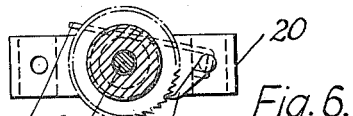
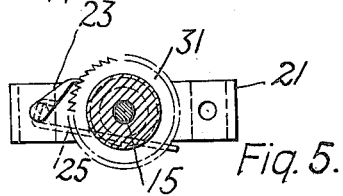
INVENTORS
William M. Bradshaw
& Walter G. Mylius
BY
Wesley G. Carr
ATTORNEY

UNITED STATES PATENT OFFICE.

WILLIAM M. BRADSHAW AND WALTER G. MYLIUS, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,202,788.  Specification of Letters Patent.  Patented Oct. 31, 1916.

Application filed May 28, 1913. Serial No. 770,383.

*To all whom it may concern:*

Be it known that we, WILLIAM M. BRADSHAW and WALTER G. MYLIUS, citizens of the United States, and residents of Wilkinsburg, in the county of Allegheny and State of Pennsylvania, have invented a new and useful Improvement in Electrical Measuring Instruments, of which the following is a specification.

Our invention relates to electrical measuring instruments and particularly to a double ratchet type of watthour meter.

The object of our invention is to provide a watthour instrument with a double ratchet attachment which will cause the instrument to register correctly, irrespective of the direction of rotation of its armature.

Watthour measuring instruments having no provision for preventing the shifting of conductors allow current theft to be practised to some extent. Several devices have been provided to prevent an instrument from registering in the wrong direction, but the majority of these have been complicated in their construction. In our invention, we provide ratchets and ratchet wheels which drive the integrating mechanism in one direction, irrespective of the direction of rotation of the instrument's armature. Our arrangement is simple in construction and admits of easy repair of the instrument.

Having described the principle of our invention, a clearer idea of its structural and operative characteristics may be had by referring to the accompanying drawings, of which—

Figure 1 is a top plan view of an instrument embodying our invention. Fig. 2 is an end elevation of the parts shown in Fig. 1. Fig. 3 is a rear elevation of the parts shown in Figs. 1 and 2. Fig. 4 is a detail view, partially in plan and partially in section, of the parts directly embodying our invention. Fig. 5 is a sectional view taken on the line V—V of Fig. 4, and Fig. 6 is a sectional view taken on the line VI—VI of Fig. 4.

Our invention is incorporated in an integrating watthour meter 1, and comprises a movable element (not shown) which transmits its rotative motion through a shaft 2, to a pinion 3. The pinion 3 engages a gear wheel 4 that is mounted on an arbor 5 which is journaled in plates 6 and 7. On the arbor 5 is mounted also a pinion 8 that engages a gear wheel 9 on an arbor 10, which is also journaled in the plates 6 and 7. A worm screw 11, that is mounted on the arbor 10, drives two worm wheels 12 and 13 that are mounted rigidly on the shafts 14 and 15, respectively. The gear wheels 12 and 13 engage the worm screw 11 on opposite sides thereof. The shafts 14 and 15 have securely mounted thereon stop collars 16 and 17 and carrying collars 18 and 19 respectively. The carrying collars 18 and 19 have attached thereto arms 20 and 21 upon which are pivotally mounted pawls 22 and 23. The pawls 22 and 23 are restrained in engagement by springs 24 and 25 that are attached to the collars 18 and 19, respectively. Loosely mounted on the shafts 14 and 15, are sleeves 26 and 27, respectively carrying gear wheels 28 and 30, and oppositely disposed ratchet wheels 29 and 31. The ratchet wheels 29 and 31 are engaged by pawls 22 and 23 in opposite directions so that, when one pawl is driving, the other is riding idly over its corresponding ratchet wheel. The shafts 14 and 15 are journaled in plates 32, 33 and 34. The gear wheels 28 and 30 engage a gear wheel 35 that is mounted between them on a shaft 36. On the shaft 36 is mounted also a pinion 37 that engages a gear wheel 38 on a shaft 39. The shaft 39 has a pointer 40 of an integrating mechanism 41 attached thereto at its outer end. Since the integrating mechanism is of a type familiar to those skilled in the art, it consequently, will not be further described.

The operation is as follows: Assume the meter armature to be rotating in such a direction that the worm wheel 11 rotates in a direction, as shown by the arrow in Fig. 4, driving the gear wheels 12 and 13 in opposite directions, and causing the pawl 23 to actuate the ratchet wheel 31. The gear wheel 30 being thus operated, drives the gear wheel 35 as hereinbefore described. The gear wheel 12 drives the sleeve 18 which, in turn, drives the pawl 22, allowing it to slip over the ratchet wheel 29 that is being rotated by the gear wheel 35. Should, however, the rotating element reverse its direction of rotation, the pawl 22 would drive wheel 29 and allow the pawl 23 to slip over its ratchet wheel 31, thus causing the integrating mechanism 41 to move in the same direction irrespective of the direction of rotation of the armature of the meter.

Having described the principle and operation of our invention, together with the apparatus which we now consider to represent the best embodiment thereof, we do not limit our invention to the specific structure herein described, for the principle can be applied to any electrical measuring instrument without departing from the spirit of our invention.

We claim as our invention:

1. The combination with two parallel oppositely rotatable shafts, of a ratchet wheel loosely mounted on each of said shafts, a pawl mounted on each of said shafts for engaging said ratchet wheels, a unidirectional driven mechanism, and means for operatively connecting said driven mechanism to said ratchet wheels.

2. In an electrical measuring instrument, the combination with a rotatable shaft having a worm screw mounted thereon, and an integrating mechanism, of two parallel shafts having worm wheels mounted thereon for engaging said worm screw, sleeves loosely mounted on said parallel shafts, a gear wheel and a ratchet wheel mounted on each of said sleeves, a pawl attached to each of said shafts for engaging said ratchet wheels, and a gear wheel disposed between the gear wheels on the sleeves for actuating the integrating mechanism in one direction.

3. In an electrical measuring instrument, the combination with a main rotatable shaft having a worm screw mounted thereon, and an integrating mechanism, of two parallel shafts having worm wheels mounted thereon for engaging said worm screw, sleeves loosely mounted on said parallel shafts, a gear wheel and a ratchet wheel mounted on each of said sleeves, a pawl attached to each of said shafts for engaging said ratchet wheels, and means disposed between the gear wheels on the sleeves to actuate the integrating mechanism in one direction irrespective of the direction of rotation of the main shaft.

4. In an electrical measuring instrument, the combination with a rotatable member having a worm screw mounted thereon, and an integrating mechanism, of two parallel shafts having worm wheels thereon for engaging said worm screw on opposite sides thereof, sleeves loosely mounted on said parallel shafts, means mounted on the shafts for driving said sleeves, and means disposed between the sleeves for connecting said sleeves to said integrating mechanism.

5. In an electrical measuring instrument, the combination with a main shaft for supporting the armature of said instrument, of a train of gear wheels driven by said main shaft, a second shaft driven by said train of gear wheels, a worm screw mounted on said second shaft, a second train of gear wheels operating a plurality of pointers, two parallel shafts having worm wheels mounted thereon for engaging said worm screw on opposite sides thereof, sleeves loosely mounted on said parallel shafts, means mounted on the shafts for driving said sleeves, and means disposed between the sleeves for connecting the same to said plurality of pointers.

6. In an electrical measuring instrument, the combination with a main shaft supporting the armature of said instrument, of a train of gear wheels driven by said main shaft, a second shaft driven by said train of gear wheels, a worm screw mounted on said second shaft, a second train of gear wheels operating a plurality of pointers, two parallel shafts having worm wheels mounted thereon for engaging said worm screw on opposite sides thereof, sleeves loosely mounted on said parallel shafts, a gear wheel and a ratchet wheel mounted on each of said sleeves, means mounted on the shafts for driving said ratchet wheels and said gear wheels, and means disposed between the gear wheels for connecting the same to said pointers.

7. In an electrical measuring instrument, the combination with a main shaft supporting the armature of said instrument, of a train of gear wheels driven by said main shaft, an arbor driven by said train of gear wheels, a worm screw mounted on said arbor, a second train of gear wheels operating a plurality of pointers, two parallel shafts having worm wheels mounted thereon for engaging said worm screw on opposite sides thereof, sleeves loosely mounted on said parallel shafts, a gear wheel and a ratchet wheel mounted on each of said sleeves, an arm attached to each of said parallel shafts, a pawl pivotally mounted on said arm, a spring connected to said arm for holding said pawl in engagement with said ratchet wheel, and means for operatively connecting said gear wheels on said sleeves to said pointers.

8. In an electrical measuring instrument, the combination with a main shaft supporting the armature of said instrument, of a train of gear wheels driven by said main shaft, an arbor driven by said train of gear wheels, a worm screw mounted on said arbor, a second train of gear wheels operating a plurality of pointers, two parallel shafts having worm wheels thereon for engaging said worm screw on opposite sides thereof, sleeves loosely mounted on said parallel shafts, a gear wheel and a ratchet wheel mounted on each of said sleeves, an arm attached to each of said parallel shafts, a pawl pivotally mounted on said arm, means for holding said pawl in engagement with said ratchet wheel to drive the sleeve, a second single shaft, a gear wheel on said shaft for engaging said gear wheels on said sleeves and a pinion on said second single shaft for driving said second train of gear wheels.

9. The combination with a rotatable member, and a driven member, of two parallel shafts driven in opposite directions by said rotatable member, a ratchet wheel loosely mounted on each of said shafts, means attached to said shafts for engaging said ratchet wheels, and means for operatively connecting said ratchet wheels to said driven member.

10. In a unidirectional energy transmitting device, the combination with a rotatable member, and a unidirectional driven member, of two parallel shafts driven in opposite directions by said rotatable member, a ratchet wheel loosely mounted on each of said shafts, a pawl attached to each of said shafts for engaging said ratchet wheels, and means for operatively connecting said ratchet wheels to said unidirectional driven member.

11. In an electrical measuring instrument, the combination with two oppositely rotatable parallel shafts, of a loose sleeve on each of said shafts, a gear wheel and a ratchet wheel on each of said sleeves, a collar mounted on each of said shafts, an arm attached to each of said collars, a pawl pivotally mounted on each of said arms, said pawls being similarly mounted and adapted to engage said ratchet wheels, and a mechanism driven by said gear wheels on said sleeves, said mechanism rotating in one direction, irrespective of the direction of rotation of said worm gear.

In testimony whereof, we have hereunto subscribed our names this 21st day of May, 1913.

WILLIAM M. BRADSHAW.
WALTER G. MYLIUS.

Witnesses:
ALVA G. CORRAO,
B. B. HINES.